United States Patent
Hemmings et al.

(10) Patent No.: US 11,673,539 B2
(45) Date of Patent: Jun. 13, 2023

(54) PRESSURE EQUALIZATION VALVE

(71) Applicant: KNORR-BREMSE SYSTEME FÜR SCHIENENFAHRZEUGE GMBH, Munich (DE)

(72) Inventors: Mark Hemmings, Melksham (GB); Nigel Anstey, Melksham (GB); Justin Peare, Melksham (GB)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 126 days.

(21) Appl. No.: 17/275,349

(22) PCT Filed: Sep. 11, 2019

(86) PCT No.: PCT/EP2019/074228
§ 371 (c)(1),
(2) Date: Mar. 11, 2021

(87) PCT Pub. No.: WO2020/053279
PCT Pub. Date: Mar. 19, 2020

(65) Prior Publication Data
US 2022/0048485 A1    Feb. 17, 2022

(30) Foreign Application Priority Data
Sep. 11, 2018  (GB) .................................. 18193585

(51) Int. Cl.
*B60T 8/36*   (2006.01)
*B60T 8/17*   (2006.01)
(Continued)

(52) U.S. Cl.
CPC .......... *B60T 8/3605* (2013.01); *B60T 8/1705* (2013.01); *B60T 13/683* (2013.01); *B60T 15/027* (2013.01); *B60T 15/52* (2013.01)

(58) Field of Classification Search
CPC ...... B60T 8/3605; B60T 8/362; B60T 13/683; B60T 15/027; B60T 15/52
See application file for complete search history.

(56) References Cited

U.S. PATENT DOCUMENTS

| 5,083,843 A | 1/1992 | Engle |
| 6,209,971 B1 * | 4/2001 | Ho ........................ B60T 8/3675 |
| | | 303/119.2 |

(Continued)

FOREIGN PATENT DOCUMENTS

| DE | 2606199 A  * | 8/1977 | ............ B60T 8/3605 |
| DE | 3430408 A1 | 2/1986 | |

(Continued)

OTHER PUBLICATIONS

International Search Report corresponding to PCT/EP2019/074228 dated Oct. 14, 2019.

*Primary Examiner* — Thomas J Williams
(74) *Attorney, Agent, or Firm* — Barnes & Thornburg LLP

(57) ABSTRACT

A pressure equalization valve arrangement for a rail brake system includes a hold valve and a membrane vent valve each having a control chamber. The hold valve and vent valve are piloted by a respective solenoid valve. A further solenoid valve is connected to the control chamber of the vent valve to allow the pressure across the vent valve membrane to be equalized with the brake cylinder pressure to decrease the pressure difference across the membrane. This results in an improved vent time.

16 Claims, 1 Drawing Sheet

(51) Int. Cl.
  *B60T 13/68* (2006.01)
  *B60T 15/02* (2006.01)
  *B60T 15/52* (2006.01)

(56) References Cited

U.S. PATENT DOCUMENTS

| | | | | |
|---|---|---|---|---|
| 9,180,849 B2 * | 11/2015 | Grebe | ................... | B60T 8/4818 |
| 9,637,099 B2 * | 5/2017 | Eidenschink | ......... | B60T 8/3675 |
| 10,981,551 B2 * | 4/2021 | Bialon | .................. | B60T 13/683 |
| 2022/0048485 A1 * | 2/2022 | Hemmings | ........... | B60T 8/1705 |

FOREIGN PATENT DOCUMENTS

| | | | | | |
|---|---|---|---|---|---|
| EP | 304610 | A2 | | 3/1989 | |
| EP | 352552 | A2 | | 1/1990 | |
| EP | 3183147 | A1 | | 6/2017 | |
| GB | 964104 | A | | 7/1964 | |
| GB | 1369732 | A | * | 10/1974 | ............ B60T 8/3605 |
| GB | 2097498 | B | | 4/1985 | |
| GB | 2331562 | A | * | 5/1999 | ............ B60T 15/027 |
| JP | 07277166 | A | * | 10/1995 | ............ B60T 8/3605 |
| WO | 2016027045 | A1 | | 2/2016 | |

\* cited by examiner

PRESSURE EQUALIZATION VALVE

CROSS REFERENCE AND PRIORITY CLAIM

This patent application is a U.S. National Phase of International Patent Application No. PCT/EP2019/074228 filed Sep. 11, 2019, which claims priority to European Patent Application No. 18193585.9, the disclosure of which being incorporated herein by reference in their entireties

FIELD

Disclosed embodiments relate to a valve for use in an electro-pneumatic rail brake system.

BACKGROUND

Rail brake systems are characterized by having a very long service life in comparison to other pneumatic brake systems with typical maintenance intervals being around seven years. As the brake system is safety critical, component parts need to be able to reliably achieve this service life not only due to the obvious safety requirements but also due to the difficulties in performing maintenance in the field compared to other vehicles.

In addition to this requirement, modern trains in particular on passenger routes, require more sophisticated brake systems including features such as wheel slide protection. Wheel slide protection is a significant safety enhancement that not decreases stopping times but also reduces track and wheel damage in the event of wheel slide and also facilitates greater usage of the rail network as higher speeds and closer spacing of trains is possible without compromising on safety.

SUMMARY

Disclosed embodiments provide a brake valve arrangement for a rail brake system adapted to control air flow to brake cylinders comprising a hold valve and a vent valve, each having a control chamber, the vent valve being a membrane valve, wherein the hold valve and vent valve are piloted by a respective solenoid valve, wherein a further solenoid valve is connected to the control chamber of the vent valve to allow the pressure across the vent valve membrane to be equalized with the brake cylinder pressure in order to decrease the pressure difference across the membrane.

BRIEF DESCRIPTION OF FIGURES

An exemplary embodiment is described in greater detail with reference to the drawings in which.

DETAILED DESCRIPTION

EP3183147 describes a pneumatic membrane valve for use in a rail brake system having wheel slide protection. This design represented an advance in the design of brake systems but has a limit in how quickly the vent valve membrane can be opened, which limits future performance improvements.

There, therefore, exists a need for a pneumatic valve that can operate with a reduced valve vent time. According to disclosed embodiments, there is a provided a brake valve arrangement for a rail brake system adapted to control air flow to brake cylinders comprising a hold valve and a vent valve, each having a control chamber, the vent valve being a membrane valve, wherein the hold valve and vent valve are piloted by a respective solenoid valve, wherein a further solenoid valve is connected to the control chamber of the vent valve to allow the pressure across the vent valve membrane to be equalized with the brake cylinder pressure in order to decrease the pressure difference across the membrane.

Optionally, the further solenoid is in fluid communication with the outlet of the hold membrane valve. Optionally, the further solenoid is in fluid communication with an inlet of the vent solenoid. Optionally, the further solenoid valve receives the brake pressure.

The system comprises two membrane pneumatic valves, used to pressurise and vent a brake cylinder. The pressure in the control chambers is controlled by solenoid valves connected to the supply pressure. A further solenoid valve is connected to the control chamber of the vent membrane valve, this is to allow the pressure across the membrane to be equalized with the brake cylinder pressure in order to decrease the pressure difference across the membrane surface.

The equalization of the pressure across the vent membrane surface significantly reduces the time required to open the vent valve membrane. The design of the disclosed embodiments also significantly reduces the stress induced in the membrane, which results in an increased operating life compared to known solutions.

Figure 1:
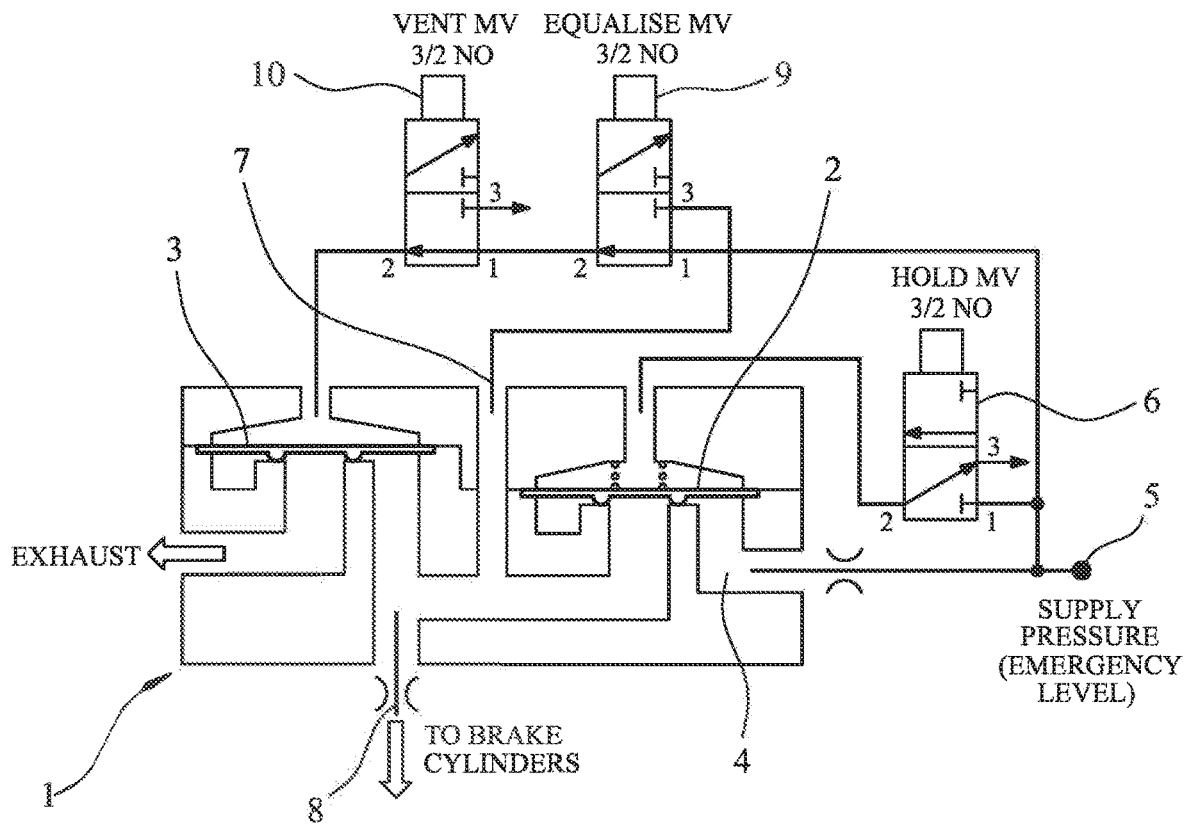
FIG. 1 shows schematically a valve arrangement in accordance with the disclosed embodiments.

FIG. 1 shows schematically a valve arrangement comprising a valve block 1 having a hold membrane 2 and a vent membrane 3. The inlet 4 of the hold membrane 3 is connected via a choke to the supply pressure 5 and is piloted by a hold solenoid 6.

The hold solenoid 6 is supplied with pressure from the supply pressure 5, which also supplies an equalization solenoid 9, which is in series with the vent solenoid 10. The equalization solenoid 9 is in fluid connection with the valve block 1 and receives a brake pressure from the outlet 7 of the hold membrane 2. The hold solenoid supplies a pilot pressure to the hold membrane 2, which is biased by spring means to the closed position.

The outlet 7 of the hold membrane 2 is in fluid communication with the outlet to the brake cylinders 8 and also with the equalize solenoid 9 and with the inlet of the vent membrane 3. The vent membrane is piloted by the vent solenoid 10 with the outlet of the vent membrane being the exhaust to atmosphere.

In brake release the hold membrane 2 is held closed by applying the supply pressure to its control chamber, by energising the hold solenoid valve 6. The brake cylinder is vented to atmosphere by exhausting the vent valve control chamber 3, by energising the vent solenoid valve 10.

When the brake is applied, the vent membrane 3 is closed by applying the supply pressure 5 to the vent valve control chamber by de-energising the vent solenoid valve 10. The hold valve membrane 2 is then opened by exhausting the hold valve control chamber, by de-energising the hold solenoid valve 6. The supply pressure 5 is thus applied to the brake cylinder.

To hold the pressure in the brake cylinder following an application of the brakes the hold membrane 2 is closed by energising the hold solenoid valve 6 enabling application of supply pressure 5 to the hold valve control chamber. The pressure across the vent valve membrane 3 can then be equalized to the brake cylinder pressure by energising the equalization solenoid valve 9.

To vent pressure in the brake cylinder the vent valve control chamber is exhausted, by opening the vent solenoid valve 10. As the control chamber has been equalized to the brake cylinder pressure the time to open the valve, which depends on the differential pressure across the membrane is reduced compared to the prior art design.

In order to return to a hold condition from a vent condition the vent valve 3 is initially closed by applying supply pressure to the vent valve control chamber, by de-energising the vent solenoid valve 10 and equalization solenoid valve 9. After a period of time the pressure across the vent membrane can be equalized by energising the equalization solenoid valve 9. The time between applying the hold and equalizing the pressure is dependent on the size and design of the valve membrane.

Figure 2:
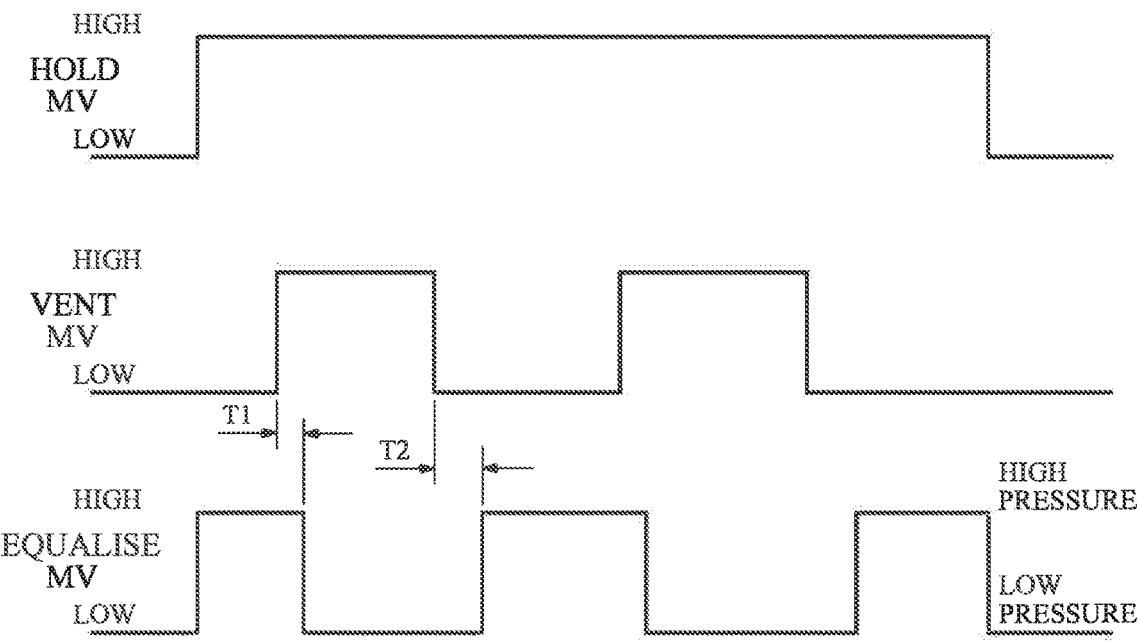
FIG. 2 shows an operating schema.

FIG. 2 shows an exemplary operating schema for the solenoid valves in which the hold and equalization solenoids are energised at substantially the same time. The vent valve solenoid is then energised before the equalization valve is de-energised after a time period T1, in readiness to close the vent again with the higher pressure after a vent membrane operation.

T2 is the time duration to ensure the vent membrane has closed with the higher pressure before the equalization solenoid is actuated to equalize the pressures. The time periods T1 and T2 are variable depending on conditions as the behaviour of the rubber of the diaphragm valve will change with temperature. An exemplary time at ambient temperature, pressure and humidity is 60 ms.

The invention claimed is:

1. A brake valve arrangement for a rail brake system configured to control air flow to brake cylinders, the arrangement comprising:
   a hold membrane valve; and
   a vent membrane valve, wherein the hold membrane valve and the vent membrane valve each have a control chamber, wherein the hold membrane valve and vent membrane valve are piloted by respective solenoid valves; and
   a further solenoid valve connected to the control chamber of the vent membrane valve to enable equalization of a pressure across the vent valve membrane with a brake cylinder pressure to decrease a pressure difference across the vent valve membrane.

2. The brake valve of claim 1, wherein the further solenoid is in fluid communication with the outlet of the hold membrane valve.

3. The brake valve of claim 1, wherein the further solenoid is in fluid communication with an inlet of the vent solenoid.

4. The brake valve of claim 1, wherein the further solenoid valve receives the brake cylinder pressure.

5. The brake valve of claim 1, wherein, to release the brakes in use, the hold valve membrane is held closed by applying a supply pressure to the control chamber of the hold membrane valve and by energising the solenoid valve piloting the hold membrane valve, and wherein the brake pressure in a brake cylinder is vented to atmosphere by exhausting the vent membrane valve control chamber by energising the solenoid valve piloting the vent membrane valve.

6. The brake valve of claim 1, wherein, in use, to hold the pressure in the brake cylinder following an application of the brakes, the hold membrane is closed by energising the solenoid valve piloting the hold membrane valve enabling application of supply pressure to the hold membrane valve control chamber, pressure across the vent valve membrane is then equalised to the brake cylinder pressure by energising the further solenoid valve.

7. The brake valve of claim 2, wherein the further solenoid is in fluid communication with an inlet of the vent solenoid.

8. The brake valve of claim 2, wherein the further solenoid valve receives the brake cylinder pressure.

9. The brake valve of claim 2, wherein, to release the brakes in use, the hold valve membrane is held closed by applying a supply pressure to the control chamber of the hold membrane valve and by energising the solenoid valve piloting the hold membrane valve, and wherein the brake pressure in a brake cylinder is vented to atmosphere by exhausting the vent membrane valve control chamber by energising the solenoid valve piloting the vent membrane valve.

10. The brake valve of claim 2, wherein, in use, to hold the pressure in the brake cylinder following an application of the brakes, the hold membrane is closed by energising the solenoid valve piloting the hold membrane valve enabling application of supply pressure to the hold membrane valve control chamber, pressure across the vent valve membrane is then equalised to the brake cylinder pressure by energising the further solenoid valve.

11. The brake valve of claim 3, wherein the further solenoid valve receives the brake cylinder pressure.

12. The brake valve of claim 3, wherein, to release the brakes in use, the hold valve membrane is held closed by applying a supply pressure to the control chamber of the hold membrane valve and by energising the solenoid valve piloting the hold membrane valve, and wherein the brake pressure in a brake cylinder is vented to atmosphere by exhausting the vent membrane valve control chamber by energising the solenoid valve piloting the vent membrane valve.

13. The brake valve of claim 3, wherein, in use, to hold the pressure in the brake cylinder following an application of the brakes, the hold membrane is closed by energising the solenoid valve piloting the hold membrane valve enabling application of supply pressure to the hold membrane valve control chamber, pressure across the vent valve membrane is then equalised to the brake cylinder pressure by energising the further solenoid valve.

14. The brake valve of claim 4, wherein, to release the brakes in use, the hold valve membrane is held closed by applying a supply pressure to the control chamber of the hold membrane valve and by energising the solenoid valve piloting the hold membrane valve, and wherein the brake pressure in a brake cylinder is vented to atmosphere by exhausting the vent membrane valve control chamber by energising the solenoid valve piloting the vent membrane valve.

15. The brake valve of claim 4, wherein, in use, to hold the pressure in the brake cylinder following an application of the brakes, the hold membrane is closed by energising the solenoid valve piloting the hold membrane valve enabling application of supply pressure to the hold membrane valve control chamber, pressure across the vent valve membrane is then equalised to the brake cylinder pressure by energising the further solenoid valve.

16. The brake valve claim 5, wherein, in use, to hold the pressure in the brake cylinder following an application of the brakes, the hold membrane is closed by energising the solenoid valve piloting the hold membrane valve enabling application of supply pressure to the hold membrane valve control chamber, pressure across the vent valve membrane is then equalised to the brake cylinder pressure by energising the further solenoid valve.

\* \* \* \* \*